United States Patent [19]

Mecklenborg

[11] 4,405,941
[45] Sep. 20, 1983

[54] OPTICAL PROBE

[75] Inventor: Richard A. Mecklenborg, Conklin, N.Y.

[73] Assignee: The Singer Company, Binghamton, N.Y.

[21] Appl. No.: 219,801

[22] Filed: Dec. 24, 1980

[51] Int. Cl.[3] .............................................. H04N 7/18
[52] U.S. Cl. ................... 358/104; 358/226; 434/38; 434/43
[58] Field of Search ............... 358/104, 226; 434/38, 434/43

[56] References Cited

U.S. PATENT DOCUMENTS 3,052,753 9/1962 Schwartz ........................... 358/104
3,603,726 9/1971 Garber ............................... 358/104
3,871,750 3/1975 Mecklenborg ..................... 350/286

Primary Examiner—Howard Britton
Attorney, Agent, or Firm—Stephen C. Kaufman; Jeff Rothenberg

[57] ABSTRACT

Optical probe (21) for simultaneously providing two images along independent lines-of-sight that correspond to front and side views in a single camera model visual system. An optical probe comprises a first pitch prism (24) and a second pitch prism (28). The pitch prisms have respective first and second apparent entrance pupils that are external to each prism and common to both prisms at a particular location (32). All motion of the optical probe is constrained to rotations about the location (32) of the first and second apparent entrance pupils.

27 Claims, 3 Drawing Figures

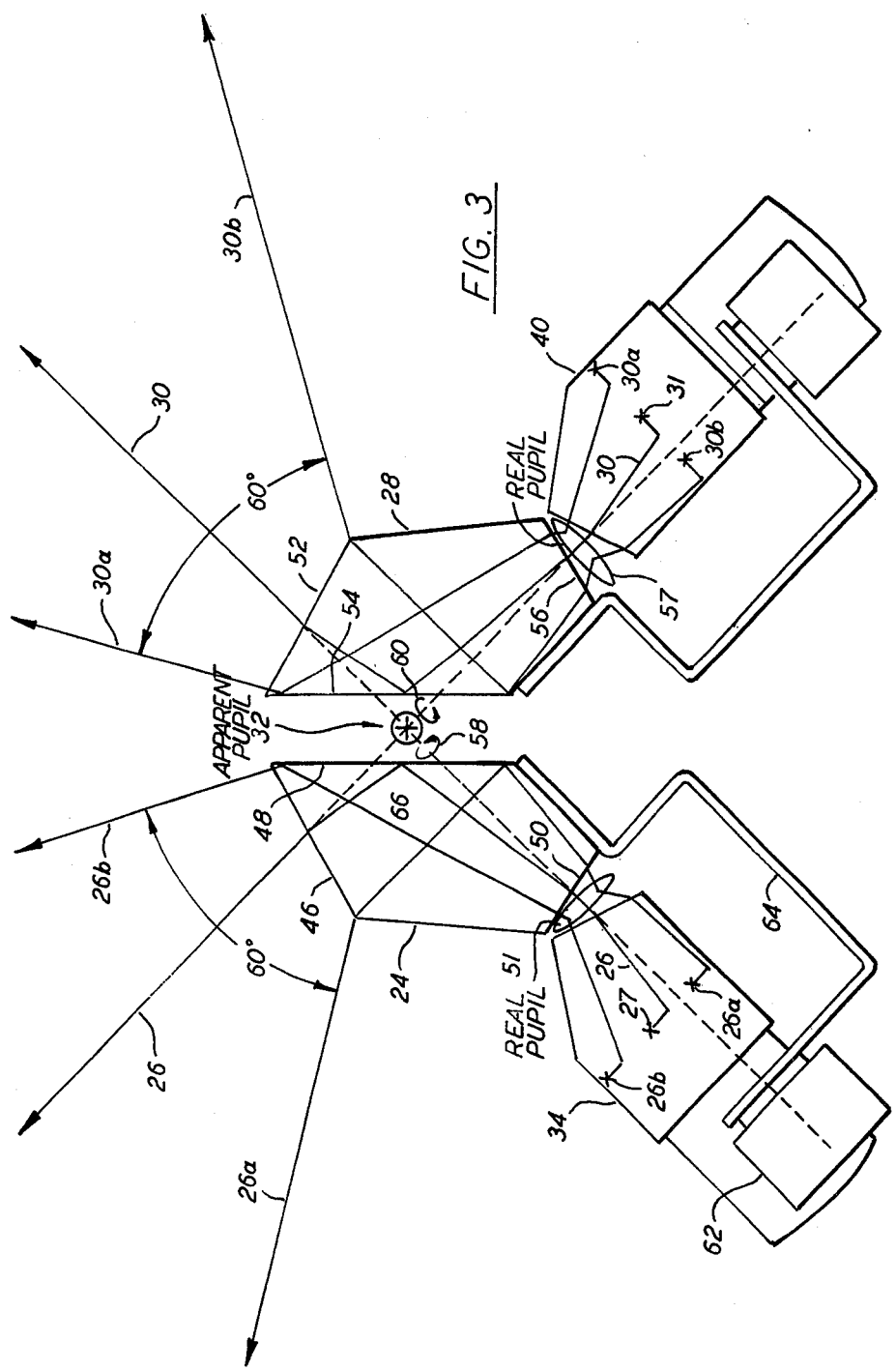

OPTICAL PROBE

TECHNICAL FIELD

The present invention relates to a visual system for use in flight simulation and more particularly relates to an optical probe for use in a camera model visual system.

BACKGROUND ART

Flight simulation is a method of training aircraft personnel. In a simulator a trainee is placed in a realistically recreated aircraft environment designed such that the trainee, without leaving the ground feels he is in and operating an actual aircraft. An important element used to create this realism is a visual system which provides the trainee with an out-of-the-window scene which varies with his operation of the flight control system of the simulator, in a manner which corresponds to conditions encountered in actual flight.

During actual flight operations, for example, a pilot will manipulate the aircraft controls and thereby provide control signals to operate the control surfaces (rudder, flaps, etc.). As this process occurs, the pilot will view a change in the visual scene that corresponds, in the general case, to linear aircraft motion (altitude, course, and drift) and rotational aircraft motion (elevation or pitch, roll, and azimuth or heading). Accurate simulation requires reproduction of this correspondence between manipulations of the controls and changes in visual scene.

One method devised to effect this desired reproduction employs a camera model visual display system, hereinafter referred to as a visual system. A visual system may comprise a scaled-down model board of a typical landscape area such as an airport and the territory surrounding it. A typical model board used in flight simulation, mounted vertically, may measure 70 to 80 feet in length and 20 to 40 feet in height. Such model boards may cost upwards of one half million dollars and require an expensive bank of lights to provide uniform illumination across the model board.

The visual system also includes an optical probe that is directed at the model board and a camera attached to the optical probe. The picture taken by the camera is transmitted through a closed circuit to a display. In this manner the trainee is typically provided with a front windshield or straight-ahead view.

In order to simulate linear aircraft motion, the optical probe and camera assembly is positioned on a moveable gantry. Altitude is simulated by movement of this assembly toward and away from the model board. The simulated course is varied by vertical movement of this assembly up and down the model board. Drift or forward motion is simulated by movement of this assembly along horizontal tracks parallel to the model board.

In order to simulate rotational aircraft motion, the optical probe is provided with a pitch entrance prism, a rotational or dove prism, and an azimuth assembly. Elevation is simulated by tilting the pitch entrance prism. The simulated roll is provided by rotation of the dove prism. Azimuth or heading is simulated by movement of the azimuth assembly, which functions to rotate the camera and optical probe combination.

The prior art visual system described so far comprises a model board, a moveable optical probe and camera, and a display. A computer system is also provided in the visual system. The computer system receives inputs responsive to the trainee's manipulations of the aircraft controls. The computer system then controls the various movements of the optical probe and camera in order to change the trainee's view.

Prior art visual systems as described above are discussed in detail in U.S. Pat. Nos. 3,603,726 and 3,052,753. These visual systems provide the trainee with only an approximately 90° field of view which corresponds to a front windshield view. An enlarged field of view e.g., a combined front and side windshield view extending over an approximately 120° field of view can not be provided by existing single probe visual systems without unacceptable sacrifices in image clarity, resolution and perspective. In actual flight, however, simultaneous front and side views must be provided in order to determine such matters as the speed of the aircraft, turning points, and altitude during low flight maneuvers. Additionally, the pilot must have a combined front and side view to determine clearance when flying nap of the earth.

One way that existing simulators provide an enlarged field of view is by duplicating a visual system in its entirety. Hence, front and side views are provided by a dual visual system that comprises two identical model boards, two optical probes, two cameras, two gantrys, two banks of lights, and two computer systems, etc.

The advantages provided by such a dual visual system are, however, seriously offset by the undesirability of having to double every element in a visual system. For example, the costs of a visual system tend to become very high due to the double expense in providing two model boards, two gantrys, etc. Duplication also increases maintenance costs while doubling the mean time required to correct failures in system components.

The present invention provides a visual system that addresses the cited problems and improves upon the prior art visual systems by providing an enlarged field of view covering both front and side views with a single probe while preserving image clarity and high resolution. The present invention allows the construction of a visual system that is significantly less costly than the existing two probe, two model board systems.

With the apparatus of the present invention, only one optical probe must be positioned on one gantry in front of one model board, in order to provide the trainee with both a front and side view.

DISCLOSURE OF THE INVENTION

Accordingly, a primary object of the present invention is to provide a visual system that is capable of providing a large field of view.

Another object of this invention is to provide a single optical probe for use in a camera model visual system capable of simultaneously providing two independent lines-of-sight that correspond to front and side window views.

Another object of this invention is to provide a trainee with front and side window images through use of only a single optical probe and single model board.

It is still a further object of this invention to provide such a visual system that is capable of simulating motion in six degrees of freedom.

These and other objects are accomplished by providing an optical probe for use in a camera model system capable of generating both front and side views, that comprises first means to define a first aperture having a field of view corresponding to the front view and having an external first apparent pupil and second means to deviate the direction of radiation passing through the first aperture. The optical probe further comprises third means for defining a second aperture having a field of view corresponding to the side view and having an external second apparent pupil and fourth means to deviate the direction of radiation passing through the second aperture. The first and second pupils are located substantially at the same location and external to the first and second means.

BRIEF DESCRIPTION OF THE DRAWINGS

These and other features of the present invention will be more clearly understood from a consideration of the following description taken in connection with the accompanying drawings in which:

FIG. 3 is a schematic diagram illustrating the preferred embodiment of the present invention.

BEST MODE FOR CARRYING OUT THE INVENTION

Figure 1:
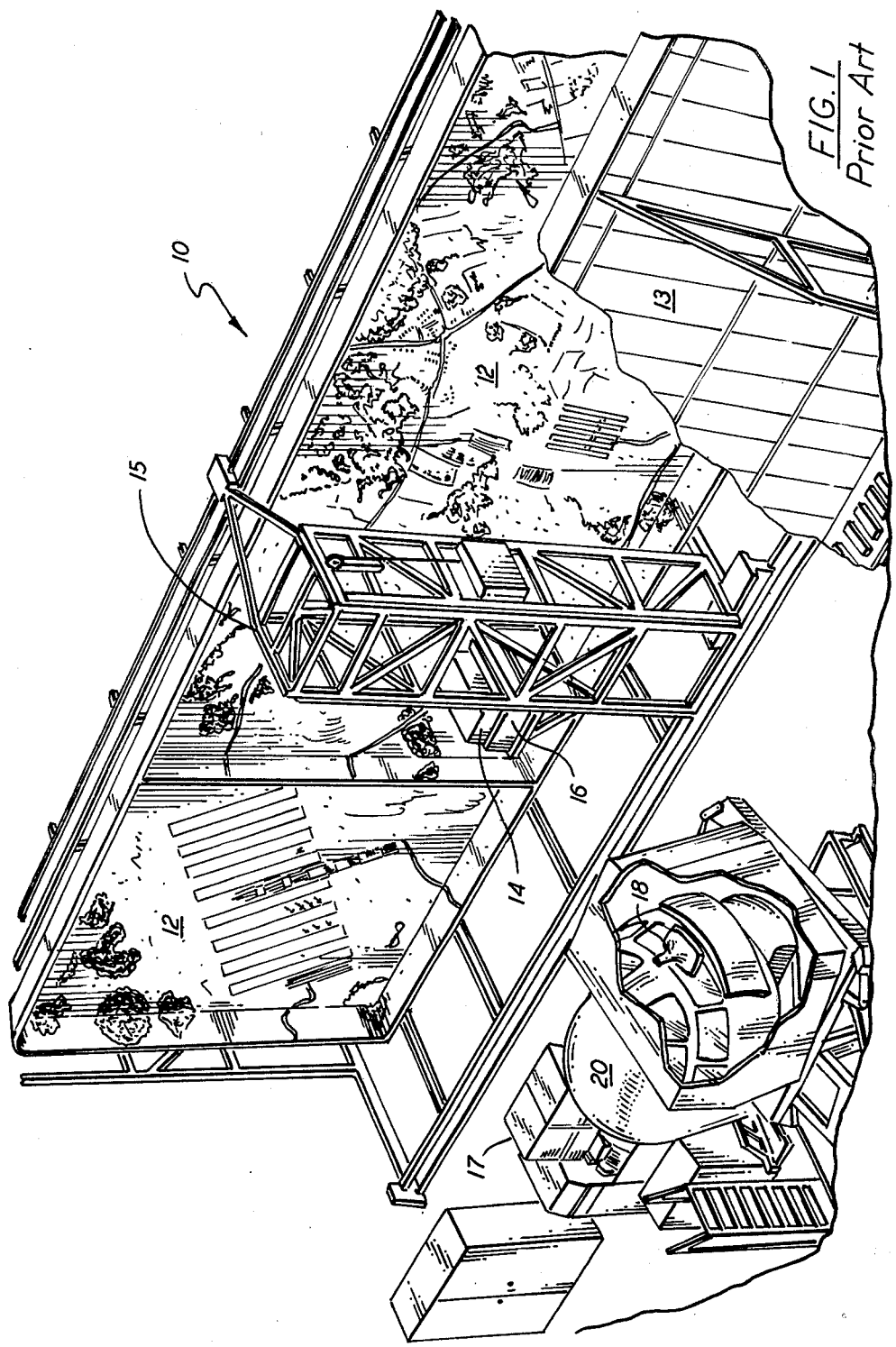
FIG. 1 shows a generalized view of a prior art visual system used in a flight simulator.

A typical prior art visual system that provides a trainee with only a front windshield view is shown in FIG. 1. Numeral 10 indicates generally a visual system comprising a model board 12, an optical probe 14, a camera 16, and a display 18. In this visual system, the model board 12 is illuminated by a bank of lights (not shown) which are supported on assembly 13. The optical probe 14, positioned on moveable gantry 15, transmits an image of the model board to the camera 16 which forwards the image to the display 18, shown here as a cathode-ray tube (CRT). Display 18 is located in a simulated cockpit 20. The elements of the visual system are controlled by computer 17.

Heretofore the trainee has been provided with a front windshield view by a first visual system such as the prior art visual system described above. A side windshield view was provided by duplicating in identical detail a second model board (not shown) and providing a second visual system that comprises a second optical probe, a second camera, a second display, etc., all of which needed to be synchronized and actuated in coordination with the first visual system. Although this arrangement provided the trainee with an enlarged field of view, it clearly necessitated very expensive duplication of visual system components.

It is at this point that the present invention radically departs from the prior art by employing a unique optical probe. The optical probe provides an enlarged field of view without the need for a second visual system as required by the prior art. The present invention may be applied to existing visual systems in order to simulate aircraft movement such as pitch, roll, and heading (discussed more fully hereinafter).

Before describing in detail the preferred embodiment of the optical probe of the present invention, the overall configuration and interconnection of the optical probe within the visual system will be discussed with reference to the functional block diagram of FIG. 2. For clarity, in FIG. 2 conventional optical transmission elements, for example, field compression lenses, relay lenses, and path folding prisms have been deleted. The integration of such optical transmission elements with the optical probe of the instant invention will be clear to those skilled in the art.

Figure 2:
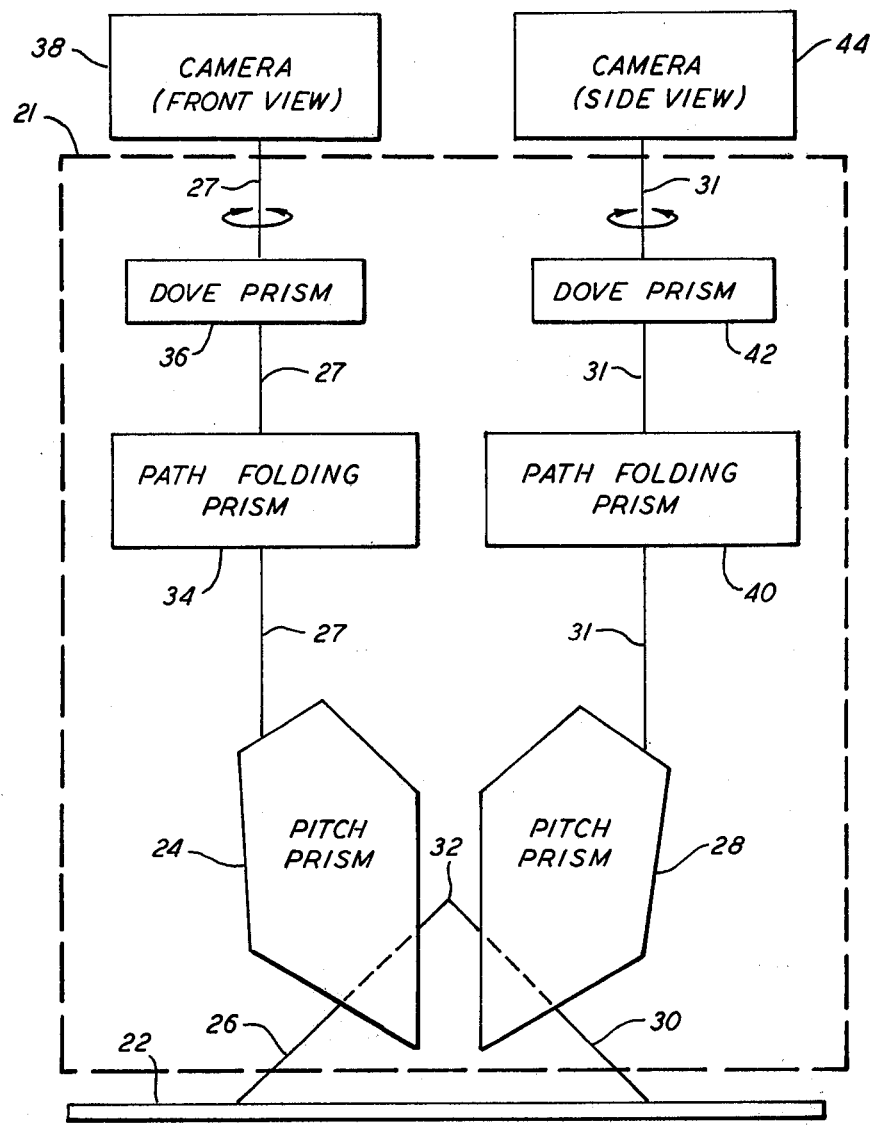
FIG. 2 shows a block diagram of an optical probe for use in a visual system that provides a large field of view, constructed according to the principles of the present invention.

The visual system of FIG. 2 includes a model board 22 and optical probe 21. First pitch prism 24 of optical probe 21 picks up imagery of the model board that corresponds to a front windshield view. Line-of-sight 26 is directed at the center of the field of view of prism 24 and presents one such image of the model board for transmission along optical axis 27. Second pitch prism 28 picks up imagery of the model board that corresponds to a side windshield view. Line-of-sight 30 is directed at the center of the field of view of prism 28 and presents one such image of the model board for transmission along optical axis 31. Lines-of-sight 26 and 30, if extended, intersect at location 32. Taken together, the two lines-of-sight provide the trainee with a front and side view. The visual system further comprises a path folding prism 34, a dove prism 36, and a camera 38 positioned along optical axis 27, and, a path folding prism 40, a dove prism 42, and a camera 44 positioned along optical axis 31.

The optical probe of FIG. 2 has two basic functions: first, it duplicates what a pilot would see through the front and side windshields while executing an aircraft maneuver; second, it provides duplication of the rotational motions of the aircraft. These functions are discussed with reference to the preferred embodiment of the present invention, shown in FIG. 3.

The optical probe of the preferred embodiment includes a first pitch prism 24. Pitch prism 24 has an entry face 46 that acts as a first aperture which encompasses a 60° field of view. Rays 26a and 26b show the contours of the field of view. The pitch prism 24 is provided with an apparent entrance pupil located external to the pitch prism 24 at location 32. A pupil may be located external to the pitch prism by a material of high index of refraction. Prisms having an index of refraction greater than 1.45, for example, an isotropic crystal like Strontium Titanate or homogeneous glass, are particularly suitable for employment in the present invention.

Pitch prism 24 deviates the direction of radiation provided along line-of-sight 26 by 90°: the incoming radiation is first refracted at the pitch prism entry face 46, then internally reflected at surface 48, and finally refracted a second time at surface 50. The convergence of rays 26, 26a and 26b at location 51 defines the real pupil of pitch prism 24. The deviated radiation proceeds past surface 50 and along optical axis 27 where it is transmitted to path folding prism 34, as discussed above with reference to FIG. 2.

The optical probe of the preferred embodiment further includes a second pitch prism 28. Pitch prism 28 has an entry face 52 that acts as a second aperture which encompasses a 60° field of view. Rays 30a and 30b show the contours of the field of view. The pitch prism 28 has an apparent entrance pupil located external to the pitch prism 28 at location 32. Pitch prism 28 deviates the direction of radiation provided along line-of-sight 30 by 90°: the incoming radiation is first refracted at the pitch prism entry face 52, then internally reflected at surface 54 and finally refracted a second time at surface 56. The convergence of rays 30, 20a and 20b at location 57, defines the real pupil of pitch prism 28. The deviated radiation proceeds past surface 56 and along optical axis 31 where it is transmitted to path folding prism 40, as discussed above with reference to FIG. 2.

In the preferred embodiment, pitch prism 24 and 28 are juxtaposed in such a manner that the angle formed by the intersecting lines-of-sight 26 and 30 form a 90° angle at location 32. This angle duplicates the fixed angle that the front windshield makes with the side windshield in the simulated cockpit of the preferred embodiment. In general, the angle defined by the line 26 extended through the center of the first aperture to the apparent entrance pupil at location 32, and the line 30 extended through the center of the second aperture to the apparent entrance pupil at location 32 has the same magnitude as the angle formed by the front and side windshields. This angle may range approximately from 70° to 110° depending upon the particular aircraft model being simulated.

The preferred embodiment therefore comprises first and second pitch prisms that have apparent entrance pupils located external to each pitch prism and common to both pitch prisms at location 32. Location 32 is also the location where the two lines-of-sight 26 and 30 intersect. Location 32 therefore represents that location which would provide the trainee with the same view he would receive if it were possible for him to actually view the model board from location 32. Location 32 must therefore remain fixed in space throughout simulated rotational motions of the aircraft. Consequently, all motion of the optical probe is constrained to rotation about location 32, and such rotations do not change the location in space of the two apparent entrance pupils.

To this end, the first pitch prism is constrained to rotate about a first axis of rotation 58 which passes through the apparent pupil at location 32 and is coincident with the deviated radiation at the real pupil 50; and the second pitch prism is constrained to rotate about a second axis of rotation 60 which passes through location 32 and is coincident with deviated radiation at the real pupil 56. Rotations of both the first pitch prism 24 and second pitch prism 28 about their respective axis function to vary the incoming radiation at the entry faces 46 and 52 respectively.

Conventional optical support apparatus and conventional servo mechanisms (not shown) may be employed in order to provide the indicated rotational motions. One such support apparatus comprises a journal 62 which has an extended arm 64 bonded to the pitch prism 24. This arrangement provides the necessary mechanical support and avoids the possibility of interference between the two rotating pitch prisms.

The manner in which the optical probe operates to achieve a desired view will be apparent from FIG. 2 taken in conjunction with FIG. 3. It is understood that pitch through the front windshield simultaneously entails roll as viewed through the side windshield, and vice versa.

Thus, any necessary changes in pitch or elevation, as observed by the trainee through the front windshield, are accomplished by simultaneously rotating first pitch prism 24 about first axis 58 and rotating second dove prism 42 about optical axis 31. This simultaneity of action provides the trainee with simulated pitch through the front windshield coupled with simulated roll through the side windshield. Appropriate rotations of prisms 24 and 42 are accomplished by servo mechanisms which are actuated in response to the trainee's controls through the medium of a computer (not shown).

In a similar manner, any necessary changes in roll, as observed by the trainee through the front windshield, are accomplished by simultaneously rotating second pitch prism 28 about second axis of rotation 60 and rotating first dove prism 36 about optical axis 27. This simultaneity of action provides the trainee with simulated roll through the front windshield coupled with simulated pitch through the side windshield. Again appropriate rotations of prism 28 and 36 are accomplished by servo mechanisms which are actuated in response to the trainee's controls through the medium of a computer.

In order to provide simulated changes in azimuth or heading the optical probe is rotated about a heading axis 66 which is defined as substantially orthogonal to the first axis of rotation 58 and the second axis of rotation 60, and passing through location 32.

In the preferred embodiment, as heretofore described, the first pitch prism 24 and the second pitch prism 28 function to deviate the direction of radiation by 90°. In alternative embodiments, not shown, the pitch prisms may deviate radiation throughout a range of angles, for example, 70° to 110°. In these alternative embodiments, pitch through the front windshield will be accompanied erroneously by simulation of side and front heading. These spurious effects may be corrected, in a manner well-known in the art, by introducing additional optics which uncouple the compound motions.

In a similar fashion, the preferred embodiment as heretofore described, positions the two lines-of-sight and hence the two pitch prisms, at a 90° angle. When this angle changes, typically in a range from 70° to 110° in order to correspond to the angle between the front and side windshields of different aircraft models, forward pitch is accompanied erroneously by side pitch. This spurious effect may be corrected, in a manner well-known in the art, by introducing additional optics which uncouple these compound motions.

One objective in mounting the optical elements of the present invention within an optical probe is to keep probe size to a minimum since the probe must be supported and accurately driven in six degrees of freedom. The present invention helps to advance this objective through proper design of the prisms which minimizes space problems. Exemplary in this respect are pitch prisms that have high indexes of refraction, maximum internal path lengths, and optimum lengths of the radiation entry—exit faces etc. For a discussion of this point, refer to Mecklenborg U.S. Pat. No. 3,871,750.

The present invention represents an advance over the prior art because the optical probe can simultaneously provide two independent lines-of-sight that correspond to front and side views in a single-camera model visual system. The present invention is therefore particularly suitable in the field of flight simulation. This is because the optical probe may be adapted to existing visual systems without the necessity for duplication of visual system components.

Although specific embodiments of the invention have been described herein, it will be obvious to those skilled in the art that various modifications may be made without departing from the spirit of the invention. For example, the principles of the present invention may be employed in a system that replaces the camera and bank of lights respectively with laser generators and appropriate photodetectors. With the foregoing in mind, it is understood that the invention is intended to be limited solely by the appended claims.

What I claim is:

1. An optical probe, for use in a camera model system, and which is capable of generating both front and side views comprising:
   (a) first means for defining a first aperture having a field of view corresponding to said front view and an external first apparent pupil;
   (b) second means for deviating the direction of radiation passing through said first aperture;
   (c) third means for defining a second aperture having a field of view corresponding to said side view and an external second apparent pupil;
   (d) fourth means for deviating the direction of radiation passing through said second aperture; said first and second pupils being located substantially at the same location and external to said first and second means respectively, whereby images corresponding to a front view and side view from said location are provided.

2. An optical probe as recited in claim 1 wherein said first and second means function to refract-reflect-refract radiation.

3. An optical probe as recited in claim 2, wherein said second and fourth means deviate radiation at an approximate 90° angle.

4. An optical probe as recited in claim 3, wherein said first and second means comprises a first pitch prism and second pitch prism respectively.

5. An optical probe as recited in claim 4, wherein said first and second pitch prisms have an index of refraction greater than 1.45.

6. An optical probe as recited in claim 5, wherein the angle defined by a line drawn from the center of said first aperture to said first pupil, and a line drawn from the center of said second aperture to said second pupil, is within an approximate range of 70° to 110°.

7. An optical probe as recited in claim 6, wherein said first and second apertures each subtend a field of view between an approximate range of 5° to 70°.

8. An optical probe as recited in claim 7 which comprises first support means mounted to rotate said first pitch prism about a first axis of rotation which passes through the real pupil and the apparent pupil of said first pitch prism, and second support means mounted to rotate said second pitch prism about a second axis of rotation which passes through the real pupil and the apparent pupil of said second pitch prism.

9. An optical probe as recited in claim 8 wherein said first and second pitch prisms comprise an isotropic crystal or homogeneous glass.

10. An optical probe as recited in claim 9 wherein said first and second pitch prisms comprise Strontium Titanate.

11. In a visual system of a simulator wherein a front and side view of a three dimensional model board is viewed by a trainee in response to manipulations of controls by the trainee, the improvement comprising:
    (a) a single optical probe to provide two images along independent lines-of-sight corresponding to said front and side views;
    (b) camera means connected to said optical probe to provide signal information corresponding to said two images; and
    (c) control means adapted to control said optical probe to provide changing images in response to commands by the trainee, whereby realistic front and side views are provided to the trainee.

12. A flight simulator as recited in claim 11, wherein said optical probe comprises:
    (a) first means for defining a first aperture having a field of view corresponding to said front view and an external first apparent pupil;
    (b) second means for deviating the direction of radiation passing through said first aperture;
    (c) third means for defining a second aperture having a field of view corresponding to said side view and an external second apparent pupil;
    (d) fourth means for deviating the direction of radiation passing through said second aperture; said first and second pupils being located substantially at the same location and external to said first and second means respectively.

13. A flight simulator as recited in claims 1 or 12, wherein the eyepoint of said trainee is effectively located substantially at the location of the intersection of said first and second pupils.

14. A flight simulator as recited in claim 13, wherein said optical probe further comprises means to rotate a first dove prism arranged along a first optical axis defined by said first pitch prism, and means to rotate a second dove prism arranged along a second optical axis defined by said second pitch prism.

15. A flight simulator as recited in claim 14, further comprising means to simultaneously rotate said first pitch prism about said first axis of rotation and said second dove prism about said second optical axis whereby forward pitch of an aircraft may be simulated.

16. A flight simulator as recited in claim 15, further comprising means to simultaneously rotate said second pitch prism about said second rotational axis and said first dove prism about said first optical axis, whereby forward roll of an aircraft may be simulated.

17. A flight simulator as recited in claim 16, wherein a heading axis is substantially orthogonal to said first and second axes of rotation and passes through said first pupil.

18. A flight simulator as recited in claim 17, further comprising means to rotate said optical probe about said heading axis, whereby changes in heading of an aircraft may be simulated.

19. A flight simulator as recited in claim 12, wherein said optical probe's first and second means function to refract-reflect-refract radiation.

20. A flight simulator as recited in claim 19, wherein said optical probe's second and forth means deviate radiation at an approximate 90° angle.

21. A flight simulator as recited in claim 20, wherein said optical probe's first and second means comprise a first pitch prism and second pitch prism respectively.

22. A flight simulator as recited in claim 21, wherein said optical probe's first and second pitch prisms have an index of refraction greater than 1.45.

23. A flight simulator as recited in claim 22, wherein said optical probe provides a combined field of view that includes a front and side view, said combined field of view encompassing an angle defined by a line drawn from the center of said first aperture to said first pupil, and a line drawn from the center of second aperture to said second pupil and subtending an approximate arc of 70° to 110°.

24. A flight simulator as recited in claim 23, wherein said optical probe's first and second apertures each subtend a field of view between an approximate range of 5° to 70°.

25. A flight simulator as recited in claim 24, wherein said optical probe further comprises first support means mounted to rotate said first pitch prism about a first axis of rotation which passes through the real pupil and the apparent pupil of said first pitch prism, and second support means mounted to rotate said second pitch prism about a second axis of rotation which passes through the real pupil and the apparent pupil of said second pitch prism.

26. A flight simulator as recited in claim 25, wherein said optical probe's first and second pitch prisms comprise an isotropic crystal or homogeneous glass.

27. A flight simulator as recited in claim 26, wherein said optical probe's first and second pitch prisms comprise Strontium Titanate.

* * * * *